(12) United States Patent
Wilhelm

(10) Patent No.: US 12,091,050 B2
(45) Date of Patent: Sep. 17, 2024

(54) SAFE AUTONOMOUS DRIVING OPERATION WITH SUN GLARE

(71) Applicant: Valeo Schalter und Sensoren GmbH, Bietigheim-Bissingen (DE)

(72) Inventor: Frederic Wilhelm, Bobigny (FR)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 280 days.

(21) Appl. No.: 17/786,843

(22) PCT Filed: Dec. 9, 2020

(86) PCT No.: PCT/EP2020/085253
§ 371 (c)(1),
(2) Date: Jun. 17, 2022

(87) PCT Pub. No.: WO2021/122211
PCT Pub. Date: Jun. 24, 2021

(65) Prior Publication Data
US 2023/0035920 A1 Feb. 2, 2023

(30) Foreign Application Priority Data

Dec. 18, 2019 (DE) ...................... 10 2019 134 962.1

(51) Int. Cl.
*B60W 60/00* (2020.01)
*B60W 50/023* (2012.01)

(52) U.S. Cl.
CPC ...... *B60W 60/0015* (2020.02); *B60W 50/023* (2013.01); *B60W 2420/403* (2013.01);
(Continued)

(58) Field of Classification Search
CPC ........... B60W 60/0015; B60W 30/165; B60W 50/029; B60W 50/023; B60W 2420/403;
(Continued)

(56) References Cited

U.S. PATENT DOCUMENTS 9,321,329 B2  4/2016 Beckman
9,720,415 B2 *  8/2017 Levinson .......... B60W 50/0205
(Continued)

FOREIGN PATENT DOCUMENTS

DE     102012105659 A1    1/2014
EP        3306523 A1 *   4/2018

*Primary Examiner* — Tarek Elarabi
(74) *Attorney, Agent, or Firm* — Osha Bergman Watanabe & Burton LLP

(57) ABSTRACT

A method for safe at least semi-autonomous driving operation of an ego vehicle in case of sun glare is disclosed. The method involves checking, by a computing system, whether one or more vehicle sensors of the ego vehicle are dazzled by sun glare, and if yes, detecting environmental information by a detection system of the ego vehicle. The method further involves subsequently checking, by a computing system, the environmental information for a presence of at least one dynamic object for intercepting the sun glare during driving operation of the ego vehicle, and if yes, checking, by a computing system, whether the ego vehicle can execute a driving manoeuvre in such a way that the at least one dynamic object intercepts the sun glare during driving operation of the ego vehicle. If yes, then the driving manoeuvre is executed.

12 Claims, 3 Drawing Sheets

Figure 1:
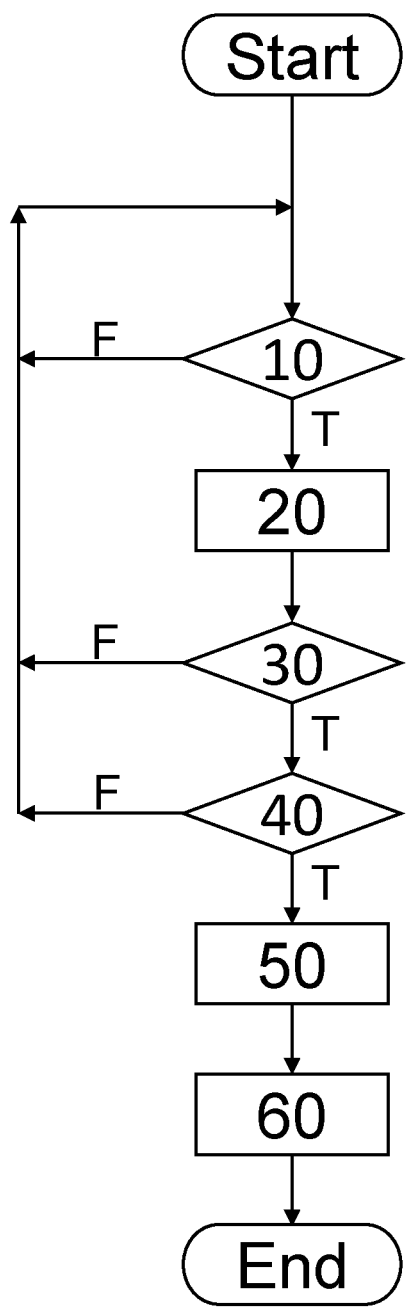

(52) U.S. Cl.
CPC ... *B60W 2420/408* (2024.01); *B60W 2554/40* (2020.02); *B60W 2555/20* (2020.02); *B60W 2555/60* (2020.02); *B60W 2720/10* (2013.01); *B60W 2720/24* (2013.01)

(58) Field of Classification Search
CPC ....... B60W 2420/408; B60W 2554/40; B60W 2555/20; B60W 2555/60; B60W 2720/10; B60W 2720/24
See application file for complete search history.

(56) References Cited

U.S. PATENT DOCUMENTS

2017/0123428 A1* 5/2017 Levinson ............ G05D 1/0291
2021/0316734 A1* 10/2021 Honda ................ G06V 20/584

* cited by examiner

SAFE AUTONOMOUS DRIVING OPERATION WITH SUN GLARE

The present invention refers to a method for safe at least semi-autonomous driving operation with sun glare.

The present invention also refers to a driving support system comprising means for executing the steps of the method.

Furthermore, the present invention refers to a vehicle comprising the driving support system.

Furthermore, the present invention refers to a computer program comprising instructions which, when the program is executed by a computer, cause the computer to execute the steps of the method.

Furthermore, the present invention refers to a data carrier signal, which the computer program transmits.

Furthermore, the present invention refers to a computer-readable medium comprising instructions which, when executed by a computer, cause the computer to execute the steps of the method.

Sensors, especially cameras, of autonomous vehicles with a driving support system, are often affected by glaring when sunlight shines, for example, right in front of the vehicle. This happens in particular during sunrise and sunset due to the sun being low on the horizon and therefore facing directly the front sensors, if the vehicle direction points towards the sun. As a consequence, the ability of each sensor and image processing algorithms to detect the environment and the road lanes is negatively affected. Therefore, the automated driving support system can take wrong decisions and have difficulties to maintain its trajectory correctly.

Current usual solutions consist in increasing the dynamic range of an image sensor to deal with the luminosity, thus increasing the sensor costs, and to integrate diagnostic logic to warn the autopilot that the sensor perception is affected, thus decreasing the automated driving support system availability. If the driving support system estimates that the light conditions are too difficult to ensure a safe autonomous driving, it requests the fallback ready user to take over control.

The German disclosure document DE 10 2012 105 659 A1 discloses in its paragraphs [0007] and [0009] a detection mechanism to determine the position of the sun. Nevertheless, the document does not disclose specific technical detail of this mechanism. However, DE 10 2012 105 659 A1 proposes as remedial action against glaring to cover the windows of the vehicle by blinds, see paragraphs [0017] and [0018].

While this may be advantageous for a driver, it is not sufficient to allow a safe and reliable detection of a sun-blinded detection system in such a way that a vehicle receives sufficiently accurate data for autonomous driving.

It is an object of the present invention to provide a method for safe at least semi-autonomous driving operation with sun glare, a driving support system, a vehicle, a computer program, a data carrier signal and a computer-readable medium, that overcome the aforementioned disadvantages.

This object is achieved by the independent claims. Advantageous embodiments are given in the dependent claims.

In particular, the present invention provides a method for safe at least semi-autonomous, preferably autonomous, driving operation of an ego vehicle in case of sun glare, comprising the following steps:

checking, by a computing system, whether one or more vehicle sensors of the ego vehicle are dazzled by sun glare;

if yes, detecting environmental information by a detection system of the ego vehicle;

checking, by a computing system, the environmental information for a presence of at least one dynamic object, which is suitable for intercepting the sun glare during driving operation of the ego vehicle;

if yes, checking, by a computing system, whether the ego vehicle can execute a driving manoeuvre in such a way that the at least one dynamic object intercepts the sun glare during driving operation of the ego vehicle;

if yes, executing the driving manoeuvre.

It is preferable that the order of the aforementioned method steps can be varied, unless technically necessary in the aforementioned order. However, the aforementioned order of the method steps is particularly preferred.

Preferably, the last step, or any of the steps, or all steps of the inventive method is or are executed in the vehicle.

In the following, the basic idea of the invention and individual elements of the claimed invention subject matter are explained in accordance with their naming in the claim set and further in the following, particularly preferred embodiments of the invention subject matter are described. Any explanations are descriptive and preferred, but not limiting examples.

The basic idea of the invention is that the automated system in the vehicle adapts its driving trajectory and uses the surrounding environment to minimize the effect of the sunlight on one or more sensors, especially front or rear sensors. To this end, it is proposed that the vehicle uses the other vehicle to shelter itself from the sun and to remain able to see the front environment.

This invention increases the availability of the driving support system by avoiding sensor glare situations, which normally result in the driver having to take over the driving of the vehicle. It also ensures a smoother and more comfortable control by avoiding perception degradation of the sensors, especially the front camera. Eventually, it will also avoid increasing the cost of the sensor by using an imager with very high dynamic range. This means that at least one sensor, preferably several sensors, located especially in the front area of the vehicle, are not glared by the sun. The invention proposes in such a case that the vehicle looks for another vehicle to act as a shield against the sun.

Sun glare is thus eliminated, in particular for the driver and/or for the ego vehicle respectively the detection system. The interception of sun glare at the vehicle refers to sun glare shining on the detection system.

The received aim of this invention is to add a logic in the maneuver and trajectory planner, that is the computing system, for the vehicle to look for a lane where it is sheltered from the horizon sunlight.

The following modules are therefore preferably integrated: a sun glare detector to detect if the detection system is glared by the sun; a computing system to detect a sheltered position where the vehicle will be less affected by the sun; a computing system, which decides to make a maneuver towards a sheltered driving position.

According to a modified embodiment of the invention, it is provided that, in case that the checking, whether the one or more vehicle sensors of the ego vehicle are dazzled by sun glare;

the checking of the environmental information for the presence of the at least one dynamic object, which is suitable for intercepting the sun glare during driving operation of the ego vehicle; or the checking, whether the ego vehicle can execute the driving manoeuvre in such a way that the at least one dynamic object intercepts the sun glare during driving operation of the ego vehicle;

is determined with no, a new checking is executed, whether one or more vehicle sensors of the ego vehicle are dazzled by sun glare. The purpose of this measure is to ensure that in the event of sun glare that cannot be eliminated by a driving manoeuvre of the ego vehicle, it is detected as early as possible whether the sun glare is still present. Thus, a driving manoeuvre is carried out by the ego vehicle as soon as possible, provided that the sun glare is still present. This is a safety enhancing measure.

According to a modified embodiment of the invention, it is provided that the checking of the environmental information for the presence of the at least one dynamic object, which is suitable for intercepting the sun glare during driving operation of the ego vehicle; and the checking, whether the ego vehicle can execute the driving manoeuvre in such a way that the at least one dynamic object intercepts the sun glare during driving operation of the ego vehicle;

comprise at least the following common steps, executed by a computing system:

determining all dynamic objects;

determining a protection zone of each dynamic object, whereby a respective dynamic object intercepts the sun glare during driving of the ego vehicle within the protection zone;

categorising the protection zone or zones into preferential protection zones and risk protection zones;

selecting the preferential protection zone for executing the manoeuvre. Thus the protection zones are subdivided into preferential protection zones and risk protection zones. Basically, protection zones are those zones in which one or more sensors of the vehicle's detection system, preferably all sensors of the detection system, are not exposed to sun glare. This is achieved in particular by the fact that the dynamic object forming the protection zone serves as a shield or, analogously, as a shadow donor. Preferential protection zones are protection zones in which the ego vehicle can follow the dynamic object without directly impairing driving safety and comfort. Accordingly, risk protection zones are those protection zones in which the ego vehicle cannot follow the dynamic object without directly impairing driving safety and comfort. The determining of all dynamic objects defines the dynamic objects that can be detected by a detection system and/or the dynamic objects that can be detected by an external detection system. Thus a preferential protection zone is selected in which the ego vehicle can follow the dynamic object preferably over a supposedly long distance, whereby the dynamic object serves as a shadow shield.

According to a modified embodiment of the invention, it is provided that a protection zone is classified as a risk protection zone if at least one of the following criteria is met:

the following of the protection zone violates a statutory provision;

the dynamic object providing the protection zone moves faster than it complies with the traffic rules and/or enables the ego vehicle to be driven safely;

the dynamic object providing the protection zone moves slower than it complies with the traffic rules and/or enables safe driving of the ego vehicle;

the dynamic object providing the protection zone moves on a lane with a departure, whereby the departure is so close to the dynamic object that in the case of a driving manoeuvre being executed by the ego vehicle and the dynamic object potentially leaving the departure, the sun glare will not be intercepted. These have proved to be the criteria which, inter alia, allow a reliable distinction to be made between preferential protection zones and risk protection zones, thus ensuring a high level of safety. A distinction is thus made between areas where the ego vehicle would be driving too fast, where the vehicle would be driving too slowly, and where the ego vehicle would be less likely to follow the dynamic object over long distances.

According to a modified embodiment of the invention, it is provided that the driving manoeuvre executed by the ego vehicle comprises adjusting its trajectory and/or speed. It has turned out that the adaptation of trajectory and/or speed are suitable measures to reach the protection zones with the Ego vehicle as safely and energy-efficiently as possible.

According to a modified embodiment of the invention, it is provided that with priority of keeping the driving destination, the ego vehicle tracks the dynamic object after the driving manoeuvre has been executed in such a way that it drives in the protection zone of the dynamic object. This may imply that the ego vehicle may change lanes to continue in the shadow of the dynamic object. It is also possible for the ego vehicle to maintain a lane or to change lanes along with the dynamic object. For this, but also for other features, the turn signal function of the dynamic object can also be considered to predict its driving behavior. In principle, however, a tracking function of the ego vehicle can be provided, whereby it is continuously controlled that the dynamic object remains positioned between the ego vehicle and the sun, in compliance with traffic rules and driving destination.

According to a modified embodiment of the invention, it is provided that the detection system comprises a laser scanner and/or a camera, in particular with a CCD sensor. A laser scanner performs laser scanning, also known as laser sensing. In this process, surfaces or bodies are irradiated with a laser beam in a line or raster pattern in order to measure or process them or to generate an image. Sensors that deflect the laser beam accordingly are called laser scanners. A laser scanner that measures the intensity of the reflected signal in addition to the object geometry is called an imaging laser scanner and is preferred. The recording of the intensity values of the laser light reflected by the recorded surfaces is exemplary for reliable detection results with laser measurement systems in 16-bit gray scales. The result is an image of the surface similar to that of a black-and-white photo. A camera, as a digital camera, captures recordings in digital memory. Digital cameras comprise an optical system, preferably using a lens with a variable diaphragm to focus light onto an image pickup device. The diaphragm and shutter admit the correct amount of light to the image, just as with film but the image pickup device is electronic and not chemical. However, unlike film cameras, digital cameras can display images on a screen immediately after being recorded, and store and delete images from memory. Thus a fast processing of the captured data is possible, as also with the laser scanner. Preferably a camera has a CCD sensor. CCD sensors are light-sensitive electronic components based on the internal photoelectric effect. CCD is the abbreviation of the charge-coupled device used in the CCD sensor. CCD image sensors consist of a matrix (array) of light-sensitive photodiodes. These can be rectangular, square or polygonal, with edge lengths ranging from 1.4 micrometers to over 20 micrometers. The larger the area of the pixels, the higher the light sensitivity and the dynamic range of the CCD sensor, but the smaller the image resolution for the same sensor size. Most CCDs are MIS structures: an insulating layer on which optically transparent electrical conductors (electrodes) are attached lies over a doped semiconductor. The charge carriers (mostly electrons, sometimes also "holes") collect underneath. Other fine electrical lines often run between the pixels and are used for reading out and shielding overexposed pixels.

According to a modified embodiment of the invention, it is provided that the detection system comprises redundant sensors of different detection principles. Redundant sensors have the advantage that they have different detection capabilities with different sun glare. However, the aim should be to ensure that no sensor is blinded by sun glare in such a way that no detection can take place at all and that the vehicle is in danger. If, for example, a camera with a CCD sensor is unable to perform a detection due to sun glare, for example, a laser scanner can perform a detection with the same sun glare. A reverse situation is also possible. Other detection principles than those mentioned above are also possible. In order to ensure the highest possible safety, redundant sensors are therefore advisable.

According to a modified embodiment of the invention, it is provided that the detection system comprises sensors which detect a vehicle front region, sensors which detect a vehicle rear region and/or sensors which detect one or both vehicle side regions. The largest application in road traffic for autonomous vehicles is probably the detection of the vehicle front area and the vehicle side areas. This is due to the fact that a vehicle usually drives straight ahead and changes lanes sideways. Therefore, such detecting sensors should be designed for this purpose. However, it can also be preferred that a rear detection is to be carried out, for example to detect vehicles approaching too quickly. To this end, it is also advantageous that the rear detectors are not dazzled. Therefore, an all-round detection is particularly preferred, as well as the execution of driving maneuvers, in order to enable an all-round detection.

The present invention also provides a driving support system comprising means for executing the steps of the method. The driving support system can comprise a driving support system for supporting autonomous or semi-autonomous driving of respective autonomous or semiautonomous vehicles, or a driver assistance system for supporting a driver of the vehicle in different driving situations.

The present invention also provides a vehicle comprising the driving support system. Preferably, the vehicle is an ego vehicle of a driver.

The present invention also provides a computer program comprising instructions which, when the program is executed by a computer, cause the computer to execute the steps of the method. A computer program is a collection of instructions for performing a specific task that is designed to solve a specific class of problems. The instructions of a program are designed to be executed by a computer and it is required that a computer can execute programs in order to it to function.

The present invention also provides a data carrier signal, which the computer program transmits.

The present invention also provides a computer-readable medium comprising instructions which, when executed by a computer, cause the computer to execute the steps of the method.

These and other aspects of the invention will be apparent from and elucidated with reference to the embodiments described hereinafter. Individual features disclosed in the embodiments can constitute alone or in combination an aspect of the present invention. Features of the different embodiments can be carried over from one embodiment to another embodiment.

Figure 3:
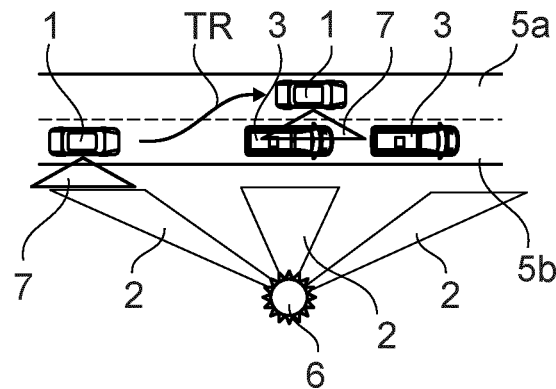
Figure 4:
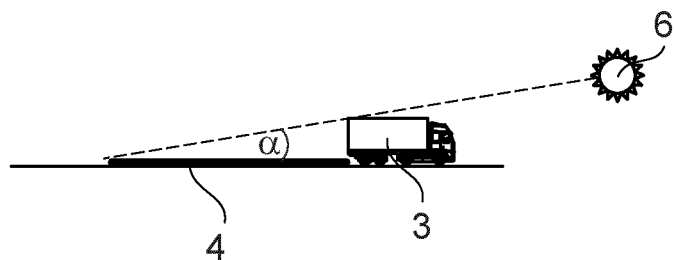

In the drawings:

FIG. 1 shows a flow chart according to a preferred method according to the invention;

FIGS. 2A-2D in individual steps, the sequence of the method according to FIG. 1 in a symbolic plan view;

FIG. 3 an alternative situation of the method according to FIG. 1 in a symbolic plan view;

FIG. 4 a side view of a protection zone existing through a dynamic object; and

Figure 5:
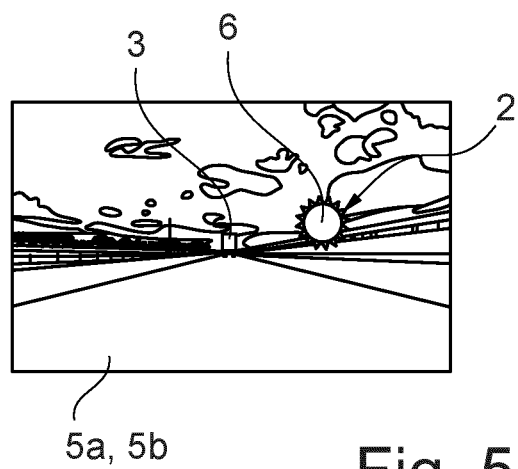

FIG. 5 a symbolic view with sun glare, perceived from a vehicle interior.

FIG. 1 shows a method for safe at least semi-autonomous driving operation of an ego vehicle 1 in case of sun glare 2, comprising the following steps:

checking, by a computing system, whether one or more vehicle sensors of the ego vehicle 1 are dazzled by sun glare 2 10;

if yes T, detecting environmental information by a detection system of the ego vehicle 1 20;

checking, by a computing system, the environmental information for a presence of at least one dynamic object 3, which is suitable for intercepting the sun glare 2 during driving operation of the ego vehicle 1 30;

if yes T, checking, by a computing system, whether the ego vehicle 1 can execute a driving manoeuvre in such a way that the at least one dynamic object 3 intercepts the sun glare 2 during driving operation of the ego vehicle 1 40;

if yes T, executing the driving manoeuvre 50;

while maintaining the priority driving target of the ego vehicle 1, following the dynamic object 3 by the ego vehicle 1 after carrying out the driving manoeuvre 50 in such a way that the ego vehicle 1 drives in the protection zone 4 of the dynamic object 3 60.

FIG. 1 further shows that, in case that the checking, whether the one or more vehicle sensors of the ego vehicle 1 are dazzled by sun glare 2 10;

the checking of the environmental information for the presence of the at least one dynamic object 3, which is suitable for intercepting the sun glare 2 during driving operation of the ego vehicle 1 30; or the checking, whether the ego vehicle 1 can execute the driving manoeuvre in such a way that the at least one dynamic object 3 intercepts the sun glare 2 during driving operation of the ego vehicle 1 40;

is determined with no F, a new checking is executed, whether one or more vehicle sensors of the ego vehicle 1 are dazzled by sun glare 2 10.

Figure 2:
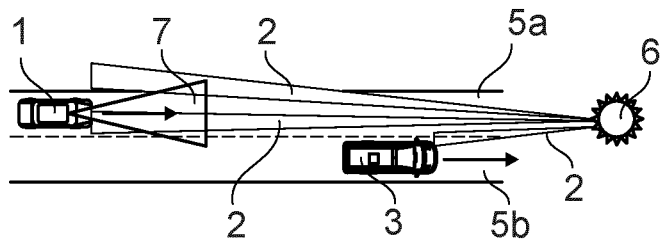
Figure 2:
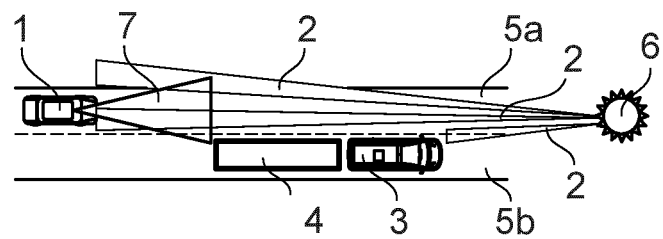
Figure 2:
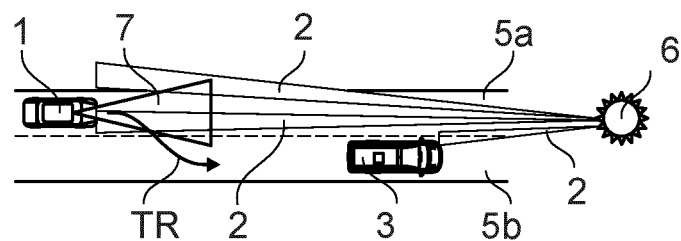
Figure 2:
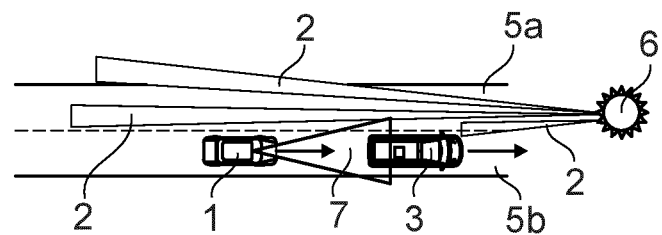

FIG. 2 shows a sequence of the method after a preferred measure of the invention in a plan view in individual steps. FIG. 2a shows an ego vehicle 1 driving in a first lane 5a and a dynamic object 3 driving in a second lane 5b. Both the ego vehicle 1 and the dynamic object 3 receive a sun glare 2 from a sun 6 standing in the direction of motion. The front view of the ego vehicle 1 in such a constellation is shown schematically in FIG. 5. This is a low-lying sun 6, whose sun glare 2 makes error-free detection difficult for the detection system of the ego vehicle 1. This is shown schematically in FIG. 2a, since the sun glare 2 intersects with a front detection field 7 of the ego vehicle 1.

The next step is to identify a protection zone 4 on which the ego vehicle 1 can drive without being exposed to the sun glare 2 of the sun 6. In principle, and independently of the embodiment, the impairment or avoidance of the sun visor 2 in relation to the ego vehicle 1 affects its detection system.

In order to select the protection zone 4 according to FIG. 2b, it is particularly intended, that the checking of the environmental information for the presence of the at least one dynamic object 3, which is suitable for intercepting the sun glare 2 during driving operation of the ego vehicle 1 30; and the checking, whether the ego vehicle 1 can execute the driving manoeuvre in such a way that the at least one dynamic object 3 intercepts the sun glare 2 during driving operation of the ego vehicle 1 40;

comprise at least the following common steps, executed by a computing system:

determining all dynamic objects 3;

determining a protection zone 4 of each dynamic object 3, whereby a respective dynamic object 3 intercepts the sun glare 2 during driving of the ego vehicle 1 within the protection zone 4;

categorising the protection zone or zones 4 into preferential protection zones and risk protection zones;

selecting the preferential protection zone as protection zone 4 for executing the manoeuvre 50.

It is preferably intended that a protection zone 4 is classified as a risk protection zone if at least one of the following criteria is met:

the following of the protection zone 4 violates a statutory provision;

the dynamic object 3 providing the protection zone 4 moves faster than it complies with the traffic rules and/or enables the ego vehicle 1 to be driven safely;

the dynamic object 3 providing the protection zone 4 moves slower than it complies with the traffic rules and/or enables safe driving of the ego vehicle 1;

the dynamic object 3 providing the protection zone 4 moves on a lane 5a, 5b with a departure, whereby the departure is so close to the dynamic object 3 that in the case of a driving manoeuvre 50 being executed by the ego vehicle 1 and the dynamic object 3 potentially leaving the departure, the sun glare 2 will not be intercepted.

FIG. 2c reveals that a trajectory TR is adapted. The Ego vehicle 1 should change from the first lane 5a to the second lane 5b. The aim is for the Ego vehicle 1 to enter the protection zone 4 respectively drive on it. Irrespective of this embodiment, the protection zone 4 is always a travelling respectively moving protection zone 4. In principle, it is preferred that the driving manoeuvre executed by the ego vehicle 1 comprises adjusting its trajectory TR and/or speed.

According to FIG. 2d, it is preferred that with priority of keeping the driving destination, the ego vehicle 1 tracks the dynamic object 3 after the driving manoeuvre 50 has been executed in such a way that it drives in the protection zone 4 of the dynamic object 3 60. As can be nicely seen in FIG. 2d, this means that the detection range 7 can freely detect. In this context, free detection means that no sun glare 2 hits the ego vehicle 1 or its detection field 7. Instead, the dynamic object 3, i.e. a truck, serves as a protective respectively shadow shield.

It is particularly preferred that the detection system comprises a laser scanner and/or a camera, in particular with a CCD sensor. It is also preferred that the detection system comprises redundant sensors of different detection principles.

It is also preferable that the detection system comprises sensors which detect a vehicle front region, sensors which detect a vehicle rear region and/or sensors which detect one or both vehicle side regions. For example, the detection system of Ego vehicle 1 in FIG. 2 is equipped with sensors that detect the vehicle front area as detection field 7. An alternative to this is shown in FIG. 3. Accordingly, the detection system of the Ego vehicle 1 in FIG. 3 is equipped with sensors which detect the vehicle side area as detection field 7. The sun 6 does not shine from the direction of motion of the ego vehicle 1, but sideways onto it. While the individual steps in FIG. 2 are shown individually, this is summarized in FIG. 3. Ego vehicle 1, for example, is shown in its original state and after it has performed a driving manoeuvre along the trajectory TR to get out of sun glare 2. If now the dynamic object 3 reduces its speed, the ego vehicle can also do this, in order to continue driving in the protection zone 4.

FIG. 4 shows an example of how the protection zone 4 is basically built. The sun 6 shines from the front onto a dynamic object 3. Behind this dynamic object 3, a shadow is created which forms the protection zone 4. It is shown that the protection zone 4 is spanned by an angle α whose origin lies on the ground. If the Ego vehicle 1 keeps the legal minimum distance to the front vehicle, it would drive in this protection zone 4.

REFERENCE SIGNS LIST 1 ego vehicle
2 sun glare
3 dynamic object
4 protection zone
5a first lane
5b second lane
6 sun
7 detection field
10 checking, by a computing system, whether one or more vehicle sensors of the ego vehicle are dazzled by sun glare
20 detecting environmental information by a detection system of the ego vehicle
30 checking, by a computing system, the environmental information for a presence of at least one dynamic object, which is suitable for intercepting the sun glare during driving operation of the ego vehicle
40 checking, by a computing system, whether the ego vehicle can execute a driving manoeuvre in such a way that the at least one dynamic object intercepts the sun glare during driving operation of the ego vehicle
50 executing the driving manoeuvre
60 while maintaining the priority driving target of the ego vehicle, following the dynamic object by the ego vehicle after carrying out the driving manoeuvre in such a way that the ego vehicle drives in the protection zone of the dynamic object
T yes
F no TR trajectory
α alpha, angle

The invention claimed is:

1. A method for safe at least semi-autonomous driving operation of an ego vehicle in case of sun glare, comprising:
   checking, by a computing system, whether one or more vehicle sensors of the ego vehicle are dazzled by sun glare;
   if yes, detecting environmental information by a detection system of the ego vehicle;
   checking, by a computing system, the environmental information for a presence of at least one dynamic object, which is suitable for intercepting the sun glare during driving operation of the ego vehicle;
   if yes, checking, by a computing system, whether the ego vehicle executes a driving manoeuvre in such a way that the at least one dynamic object intercepts the sun glare during driving operation of the ego vehicle;
   if yes, executing the driving manoeuvre.

2. The method according to claim 1, wherein when
   the checking, whether the one or more vehicle sensors of the ego vehicle are dazzled by sun glare,
   the checking of the environmental information for the presence of the at least one dynamic object, which is suitable for intercepting the sun glare during driving operation of the ego vehicle, or
   the checking, whether the ego vehicle executes the driving manoeuvre in such a way that the at least one dynamic object intercepts the sun glare during driving operation of the ego vehicle
   is determined with no, a new checking is executed, whether one or more vehicle sensors of the ego vehicle are dazzled by sun glare.

3. The method according to claim 1, wherein the checking of the environmental information for the presence of the at least one dynamic object, which is suitable for intercepting the sun glare during driving operation of the ego vehicle and the checking whether the ego vehicle executes the driving manoeuvre in such a way that the at least one dynamic object intercepts the sun glare during driving operation of the ego vehicle;
   comprise at least the following, executed by a computing system:
   determining all dynamic objects;
   determining a protection zone of each dynamic object, whereby a respective dynamic object intercepts the sun glare during driving of the ego vehicle within the protection zone;
   categorising the protection zone or zones into preferential protection zones and risk protection zones; and
   selecting the preferential protection zone for executing the manoeuvre.

4. The method according to claim 1, wherein a protection zone is classified as a risk protection zone if at least one of the following criteria is met:
   the following of the protection zone violates a statutory provision;
   the dynamic object providing the protection zone moves faster than it complies with the traffic rules and/or enables the ego vehicle to be driven safely;
   the dynamic object providing the protection zone moves slower than it complies with the traffic rules and/or enables safe driving of the ego vehicle;
   the dynamic object providing the protection zone moves on a lane with a departure, whereby the departure is so close to the dynamic object that in the case of a driving manoeuvre being executed by the ego vehicle and the dynamic object potentially leaving the departure, the sun glare will not be intercepted.

5. The method according to claim 1, wherein the driving manoeuvre executed by the ego vehicle comprises adjusting its trajectory and/or speed.

6. The method according to claim 1, wherein with priority of keeping a driving destination, the ego vehicle tracks the dynamic object after the driving manoeuvre has been executed in such a way that it drives in a protection zone of the dynamic object.

7. The method according to claim 1, wherein the detection system comprises a laser scanner and/or a camera with a CCD sensor.

8. The method according to claim 1, wherein the detection system comprises redundant sensors of different detection principles.

9. The method according to claim 1, wherein the detection system comprises sensors which detect a vehicle front region, sensors which detect a vehicle rear region and/or sensors which detect one or both vehicle side regions.

10. A driving support system with means for safe autonomous driving operation of an ego vehicle in case of sun glare, for executing steps of a method according to claim 1.

11. A vehicle comprising a driving support system according to claim 10.

12. A non-transitory computer-readable medium comprising machine readable instructions which, when executed by a computer, cause the computer to execute the method according to claim 1.

* * * * *